(12) United States Patent
Wedekamp

(10) Patent No.: US 6,303,087 B1
(45) Date of Patent: Oct. 16, 2001

(54) UV-IRRADIATION DEVICE FOR THE TREATMENT OF WASTEWATER

(76) Inventor: Horst Wedekamp, Elverdisser Str. 92, D-32052 Herford (DE)

(*) Notice: Subject to any disclaimer, the term of this patent is extended or adjusted under 35 U.S.C. 154(b) by 0 days.

(21) Appl. No.: 09/577,406

(22) Filed: May 22, 2000

(30) Foreign Application Priority Data

Mar. 3, 2000 (DE) .............................................. 100 10 127

(51) Int. Cl.⁷ .................................................. B01J 19/12
(52) U.S. Cl. ...................................... 422/186.3; 210/748
(58) Field of Search ........................ 422/186.3; 210/748; 250/431

(56) References Cited

U.S. PATENT DOCUMENTS

| | | | |
|---|---|---|---|
| 5,418,370 | * 5/1995 | Maarschalkerweerd | 250/431 |
| 5,874,470 | * 2/1999 | Ishiyama | 250/431 |
| 5,874,740 | 2/1999 | Ishiyama . | |
| 6,013,917 | * 1/2000 | Ishiyama | 250/431 |

* cited by examiner

Primary Examiner—Kathryn Gorgos
Assistant Examiner—Thao Tran
(74) Attorney, Agent, or Firm—Woodbridge & Associates, P.C.; Richard C. Woodbridge

(57) ABSTRACT

Applicant has disclosed a UV-irradiation device for treating wastewater. A number of lamp units are provided having a radiation source and an encasing tube surrounding the radiation source. The lamp units are of a general, cylindrical design. A cleaning device is provided that has cleaning elements that annularly surround and encase the tubes of the lamp units. Each of the cleaning elements are displaceable in the longitudinal direction of the encasing tube. Cleaning liquid is supplied to each of the cleaning elements. In assembly, the cleaning elements have a ring which is made of a liquid-permeable material whose internal surface is in contact with the encasing tube. The cleaning liquid is fed into the liquid-permeable material.

13 Claims, 4 Drawing Sheets

UV-IRRADIATION DEVICE FOR THE TREATMENT OF WASTEWATER

THE FIELD OF THE INVENTION

The present invention relates to a UV-irradiation device for the treatment of wastewater.

BACKGROUND

Devices for the treatment of waste water are known and one such device is disclosed in U.S. Pat. No. 5,874,740.

Microbiologically contaminated liquids (such as for example wastewater from sewage plants) may be disinfected in a particularly environmentally protective manner by irradiating them with ultraviolet radiation. For this purpose, various irradiation devices are known in the prior art. In numerous cases, the problem arises that the lamp units of the radiation devices become externally contaminated. In particular, in the case of waters having a high alkaline earth ion content, precipitation of hardness constituents takes place to form encrustations which firmly adhere to the encasing tube surfaces and which are virtually unpreventable or removable by mechanical means.

In the abovementioned patent, a device is proposed in which annular chambers surround the lamp units. The chambers are situated at the surface of the encasing tubes and are sealed there by two O-rings. The interior of the chambers is filled with a cleaning liquid (for example phosphoric acid) via a supply device. To clean the surface of the lamp unit, the chamber filled with cleaning liquid is moved to and fro on the surface, as a result of which loosely adhering contaminants are pushed aside whereas firmly adhering encrustations are dissolved by means of the cleaning liquid.

In practice, this device functions only to a limited extent since the O-ring seals of the chamber in contact with the encasing tube surface react very sensitively to mechanical damage or dimensional deviations and in addition, the chemical action of the cleaning liquid on the encasing tube surface is inadequate without mechanical aid to prevent the formation of encrustations or to remove them. The exposure times are too short for this purpose.

Accordingly, it is Applicant's intent to provide a UV-Irradiation device that is capable (even at high contents of alkaline earths is the wastewater to treated) to counteract and to prevent effectively, the formation of encrustations on the encasing tube surface.

SUMMARY OF THE INVENTION

Thus viewed from one aspect the present invention provides a UV-irradiation device for treating wastewater having a number of lamp units that each have a radiation source and an encasing tube surrounding the radiation source, the lamp units being of substantially cylindrical design, a cleaning device which has cleaning elements annularly surrounding the encasing tubes, each encasing tube being assigned at least one cleaning element and the cleaning elements being displaceable by at least one drive unit in the longitudinal direction of the encasing tubes, and a device for supplying cleaning liquid to the cleaning elements, wherein the cleaning elements have a ring which is made of a liquid-permeable material and whose internal surface is in contact with the encasing tube and the cleaning liquid is fed into the material.

Because the cleaning elements have a ring made of a liquid-permeable material whose inner surface is in contact with the encasing tube and because the cleaning liquid is fed into the material, the material can convey the cleaning liquid onto the surface of the encasing tube and chemically dissolve even the beginning of contamination, during which process the mechanical action of the material aids the cleaning operation.

A reliable transportation of the cleaning liquid onto the surface of the encasing tube is achieved if the material is sponge-like with an open-pored structure. If, on the other hand, the material is a fibrous material, the fibres can advantageously aid the cleaning action as a woven, braided or nonwoven fabric depending on mechanical properties. If the material has a continuous surface in those regions of its end faces and of its outer surface that are not in contact with the encasing tube, a kind of reservoir which is open towards the encasing tube surface is formed for the cleaning liquid and this ensures a uniform distribution and transportation of the cleaning liquid to the encasing tube surface. When the cleaning elements are actuated by displacement in the longitudinal direction of the encasing tube, the material is supported if the cleaning elements have supporting means (in particular plastic or metal discs) next to the end faces of the material and these counteract deformation of the material. The liquid is advantageously fed in from at least one permanently installed stock container by means of at least sectionally flexible hose lines so that the cleaning liquid can be supplied even during the actuation stroke of the cleaning elements. At the same time, the cleaning liquid can be fed in from the stock container by means of a systematically generated overpressure in the stock container or by static pressure. In this connection, the supply may take place through sections of hollow design in a mounting or a drive. To avoid losses and for the purpose of precise metering, the cleaning liquid is advantageously fed directly into the material.

The material may also have an open surface at its end faces and/or at its outside at least sectionally so that the cleaning liquid can be fed into the material indirectly via nozzles assigned to the end faces or the outside.

The cleaning action is improved and the service life of the material extended if the cleaning elements have scraper rings adjacent to the end faces. The scraper rings can then initially remove coarse, easily removable contaminants so that only the surfaces contaminated with firmly adhering encrustations come into the region of the material soaked with cleaning liquid. The cleaning liquid is preferably constituted in such a way as to wet the surface of the encasing tubes under operating conditions and to keep it wetted at least for a limited time so that the formation of new encrustations can be prevented even at the onset.

Advantageously, all the components are made of acid-resistant and corrosion-resistant materials.

Exemplary embodiments of the present invention are described below by reference to the drawings.

BRIEF DESCRIPTION OF THE DRAWINGS

FIG. 1 shows a cleaning element 1 of a UV-irradiation device according to the invention in a lateral cross section (FIG. 1a) and in an end view (FIG. 1b).

Figure 1A:
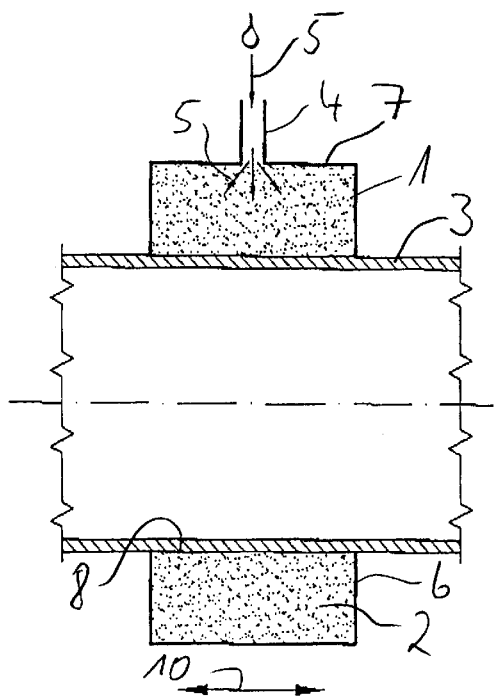
FIG. 1a shows a first embodiment in a lateral cross section having an annular cleaning element and feed into the material.

The cleaning element 1 comprises a ring 2 made of a relatively solid, foam-like material having an open-pore structure that annularly surrounds an encasing tube 3 of a lamp unit (not shown). A supply line 4 is connected centrally to the outer circumference of the ring 2 and is in communication with the foam-like material of the ring 2. A cleaning liquid 5 can be fed into the open-pore material of the ring 2 via the supply line 4. At its end faces 6 and its outer circumferential surface 7, the ring 2 is provided with a continuous surface such as can either be in a mould during the manufacture of the ring 2 or such as can be produced subsequently by sealing. It is only at its inner circumferential surface 8 adjacent to the encasing tube 3 that the ring 2 is open-pore.

During operation, the cleaning liquid 5 is fed via the supply line 4 into the material of the ring 2 from where it migrates in the direction of the encasing tube 3. The cleaning liquid cannot escape through the continuous surfaces of the end faces 6 and of the outer circumferential surface 7. A certain pressure is consequently built up.

If the ring 2 is now moved to and fro along the longitudinal axis 10 of the encasing tube 3 by actuating means not shown in great detail, the cleaning liquid 5 is (on the one hand) applied to the surface of the encasing tube 3 where it starts (for example, in the form of phosphoric acid) to dissolve the mineral encrustations (for example calcite compounds and iron compounds). The mechanical action of the ring 2 on the encasing tube surface aids this cleaning operation. More or less complete sealing and a certain wear compensation are ensured by the fact that the ring 2 is elastically in contact with the encasing tube 3.

Figure 1B:
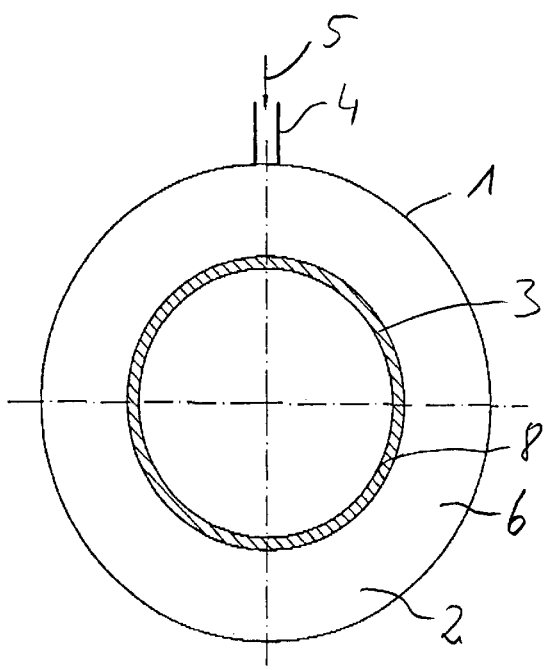
FIG. 1b shows the embodiment of FIG. 1a in an end view.
Figure 2A:
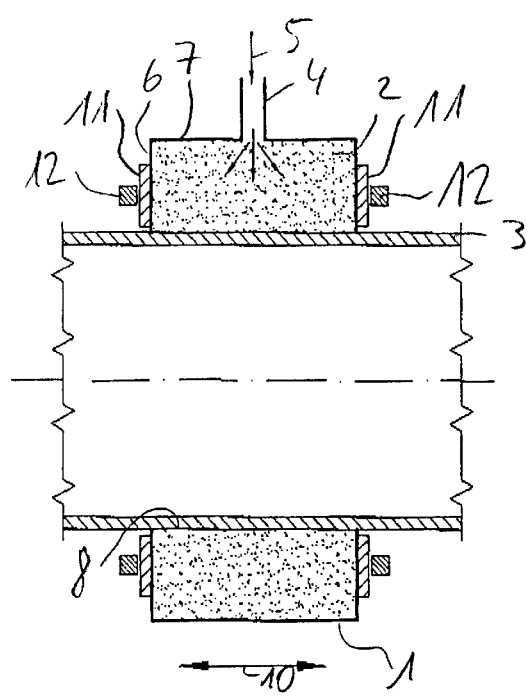
FIGS. 2a, b show a second embodiment (in views in accordance with FIGS. 1a and b) having support discs disposed laterally next to the material.
Figure 2B:
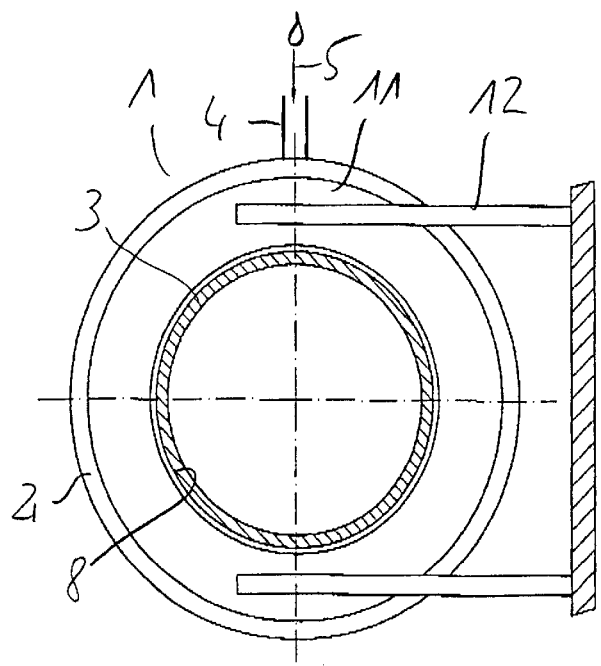

FIG. 2 shows (in views similar to that of FIGS. 1a and 1b) a further embodiment of the present invention, the same components being denoted by the same reference numerals. In this case, the end faces 6 of the ring 2 are provided with supporting discs 11 which are provided for the intervention of a mechanical actuating device 12. The supporting discs 11 prevent deformation of the ring 2 during actuation in the direction of the longitudinal axis of the encasing tube 3.

At 3a and 3b, FIG. 3 shows (again in views in accordance with FIGS. 1a and 1b) a further embodiment in which the ring 2 is laterally surrounded by support sleeves 15 which are disposed coaxially with respect to the ring 2 and at a distance from the encasing tube surface. The support sleeves 15 contain connecting lines 16 via which the cleaning liquid 5 can be fed into an annular gap 17 between the surface of the encasing tube 3 and the inner surface of the support sleeve 15.

In practice, the cleaning element described as a whole is moved to and fro on the encasing tube 3 by drive means (not shown here) in the direction of the double arrow 10. In this case, the cleaning liquid 5 is preferably fed into the respective leading annular gap 17. The first contact of the cleaning liquid 5 with the contaminated surface of the encasing tube 3 then takes place without the action of the ring 2. However, as soon as the surface of the encasing tube 3 has come into contact with the cleaning liquid 5, the trailing ring 2 follows and aids the cleaning action of the cleaning liquid 5 by mechanical action.

Figure 3A:
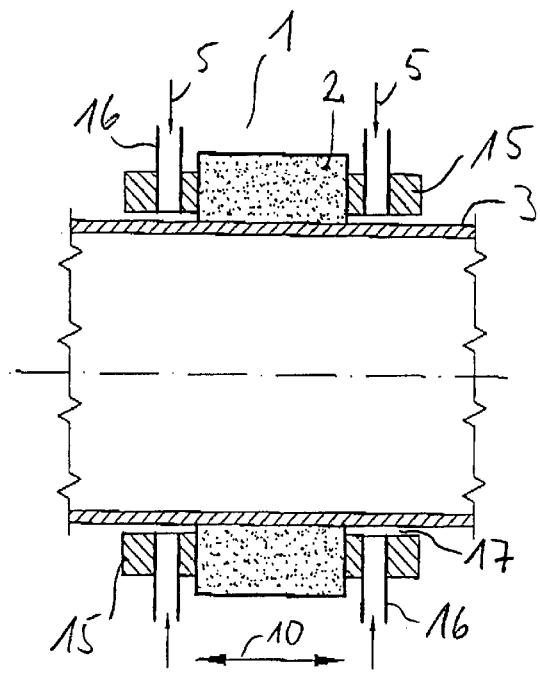
FIGS. 3a, b show an embodiment (in views in accordance with FIGS. 1a and b) with feed of the cleaning liquid into an open annular space next to the material.
Figure 3B:
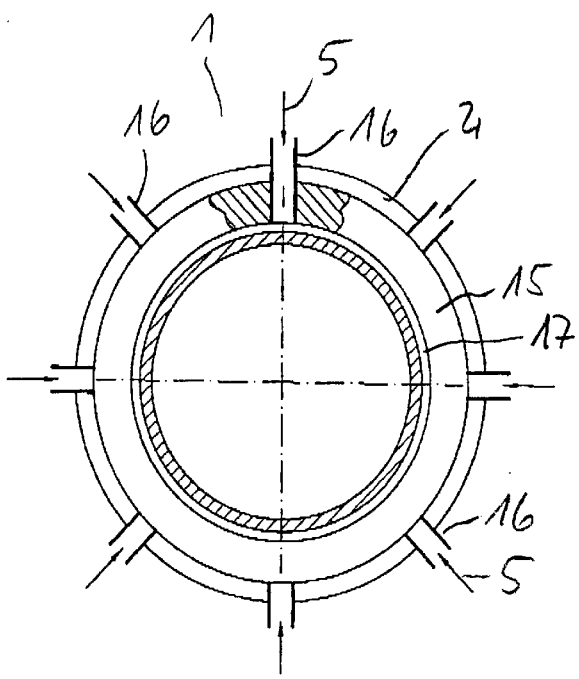
Figure 4A:
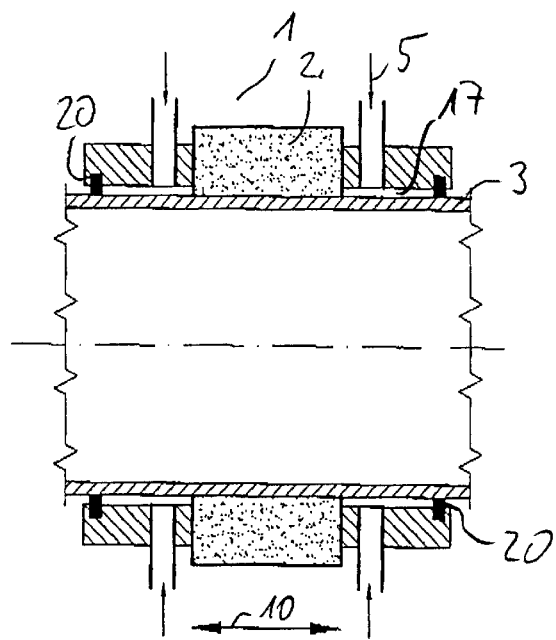
FIGS. 4a, b show the embodiment of FIG. 3 (in views according to FIGS. 1a and b) having a closed annular space.
Figure 4B:
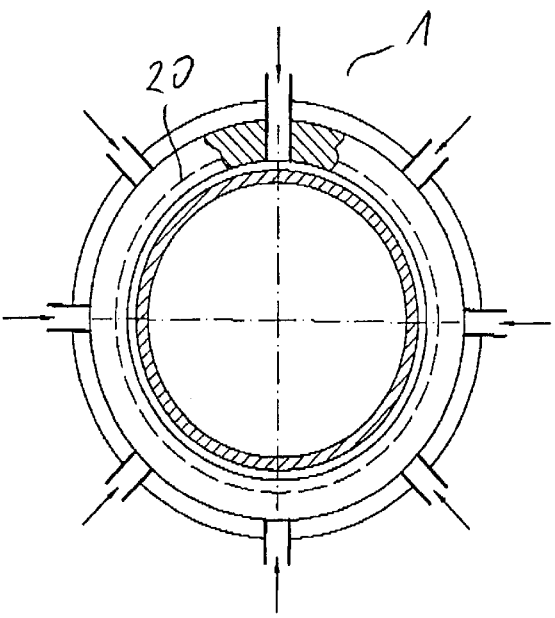

Parts 4a and 4b of FIG. 4 again show a cleaning device 1 in accordance with the views of FIGS. 3a and 3b. In this cleaning device 1, the annular space 17 is wholly or at least substantially sealed at its outside situated remotely from the ring 2 with a circumferential sealing ring or scraper ring 20. In this embodiment, the cleaning liquid 5 can escape from the annular gap 17 only at low leakage rates so that a lower delivery rate can be chosen for the cleaning liquid 5 than in the case of the exemplary embodiment in accordance with FIGS. 3a and 3b. If a scraper ring 20 is chosen, the easily removable contaminants are also aided before the action of the cleaning liquid 5 and of the ring 2 starts. This increases action and service life of the cleaning device.

Figure 5:
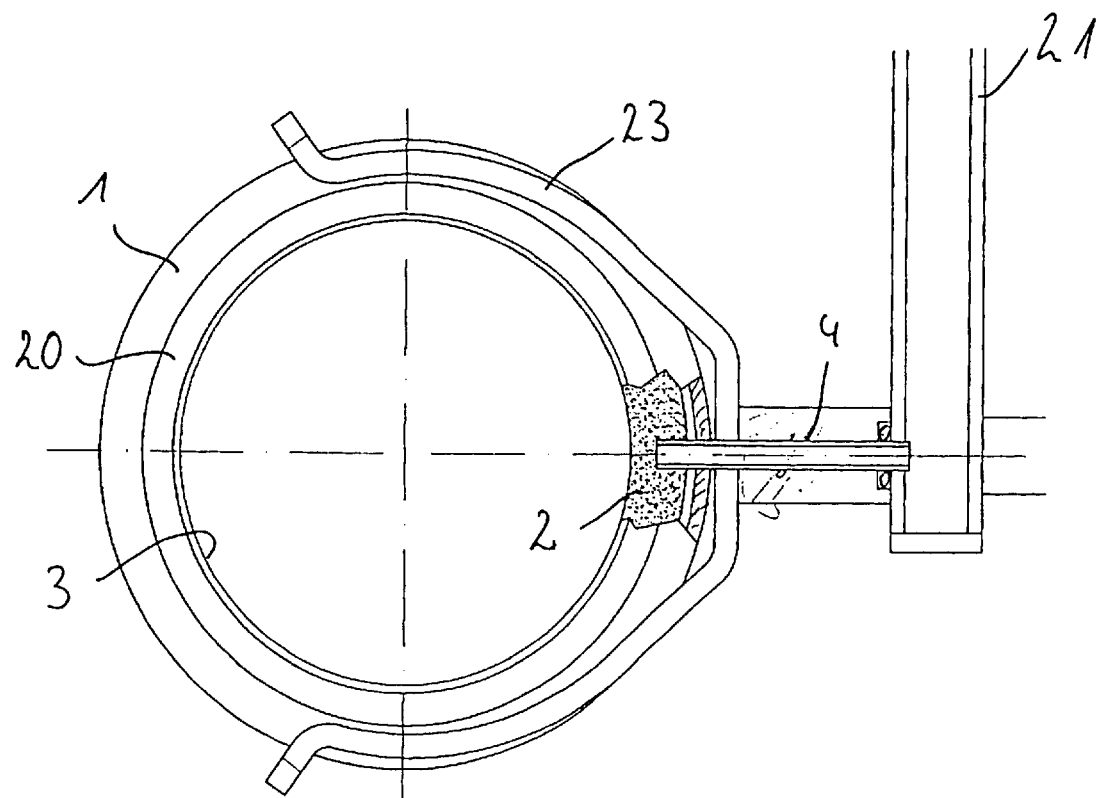
FIG. 5 shows an embodiment similar to FIG. 2b with an easily detachable liquid feed.

FIG. 5 shows a cleaning element 1 which can be removed laterally from a clamp-like holder 23 together with the encasing tube 3. In this case, the supply line 4 remains on the clamp 23 and is separated from the ring 2. When the encasing tube 3 and the cleaning element 1 are reinserted into the clamps, the supply line is likewise introduced again into the ring 2 and makes the necessary connection for the supply of cleaning liquid.

Figure 6:
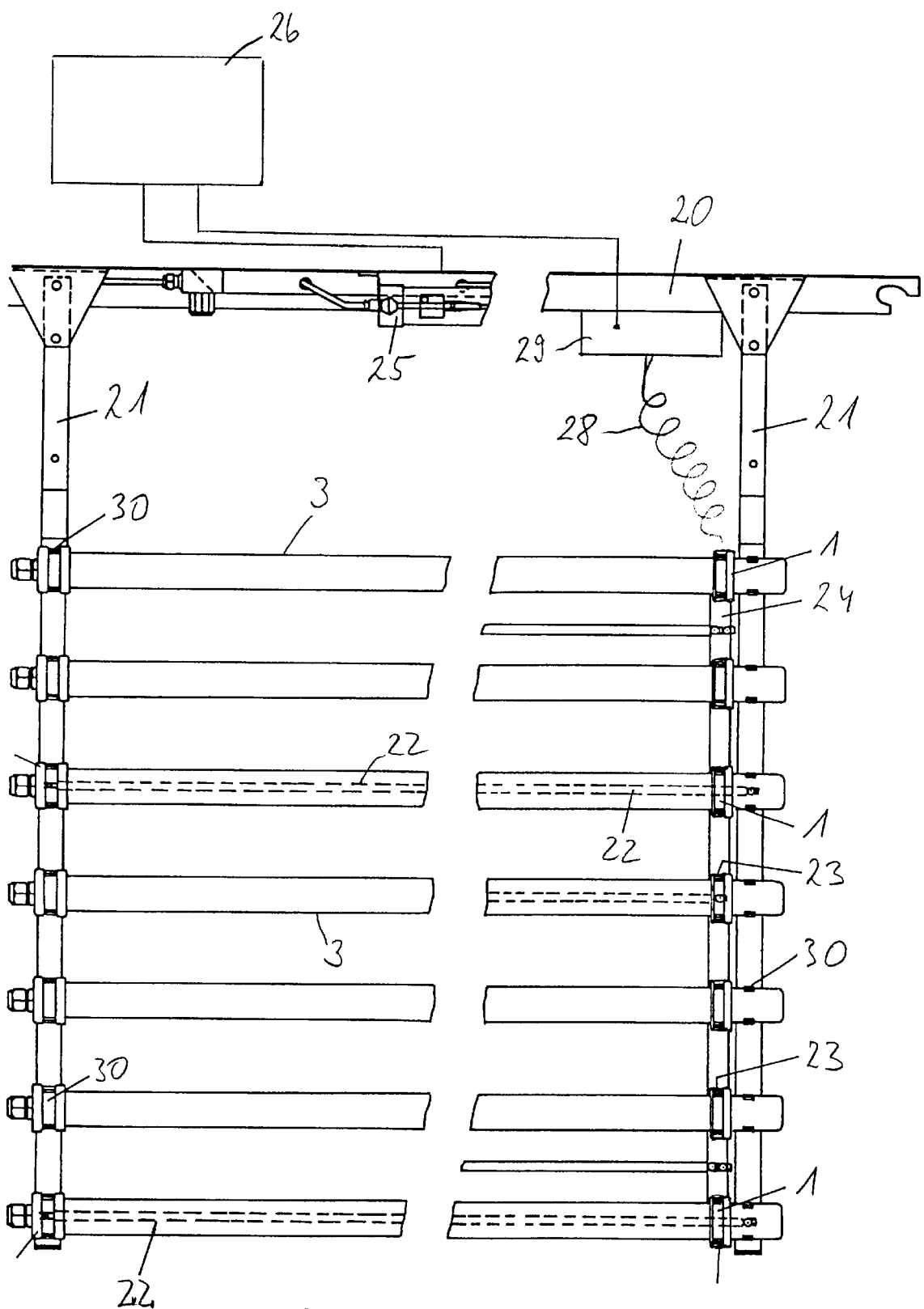
FIG. 6 shows a side view of a UV-irradiation device according to the invention having a number of lamp units, and cleaning elements to be actuated simultaneously.

Finally, FIG. 6 shows a UV-irradiation device according to the invention for wastewaters having a frame 20 which carries, on vertically disposed carriers 21, a number of parallel aligned, elongated encasing tubes 3 with UV radiators 22 situated therein.

The encasing tubes 3 each carry two cleaning elements 1 of the type which are shown in FIG. 5 and which is seated annularly on the encasing tube. The cleaning elements 1 are held by the clamps 23 of a rake-like drive unit 24. The drive unit 24 itself is actuated by connecting means (not shown) of a pneumatic actuator 25 in dependency on a control system 26 so that the cleaning elements 1 are moved to and fro in the longitudinal direction of the encasing tubes 3.

The cleaning elements 1 are furthermore interconnected via a supply line 4 that cannot be seen in this view and that is permanently attached to the drive element 24. A flexible hose line 28 supplies the supply line 4 with cleaning liquid 5 that is again fed from a metering and stock unit 29. The metering and stock unit 29 is likewise actuated in dependency on the control system 26.

In this exemplary embodiment, the lamp units with their outer encasing tubes 3 are held in laterally open clamps 30 so that they can be removed from the frame 20 transversely to the longitudinal direction of the encasing tubes 3.

Correspondingly, the holding elements 23 of the cleaning elements 1 are also laterally open so that the cleaning elements 1 can be removed with the encasing tubes 3 from the frame 20. At the same time, the supply lines 4 can be readily separated from the cleaning elements 1 if they engage, for example, by means of a conical, nozzle-type head in a mating recess on the outside of the cleaning element 1. If the cleaning element 1 is provided with a foam-like ring having outer continuous surface in accordance with FIGS. 1a and 2a, the supply line 4 may also terminate in a type of cannula which reliably penetrates the outer surface in any position of the cleaning element 1 and feeds the cleaning liquid into the open-pore interior of the ring 2. The penetrations occurring in this case of the outer continuous surface of the ring 2 are (on the one hand) at least substantially sealed again when the ring is taken off the cannula. On the other hand, the removal and replacement is seldom necessary in practice so that, during the service life of a cleaning element 1, only a few such operations are necessary and these result in negligible openings in the outer surface.

In total, a cleaning system of high efficiency and reliability results. A reliable cleaning of the surface is ensured even in the case of stubborn or fast growing encrustations, such as are to be expected in the case of wastewaters with a high content of lime-forming agents. In addition, the system can be maintained at very low cost as a result of the mounting of the lamp units and of the cleaning elements 1 described in connection with FIG. 5.

I claim:

1. A UV-irradiation device for treating wastewater comprising:
   a plurality of lamp units each having a radiation source and an encasing tube surrounding the radiation source, the encasing tube being of a substantially cylindrical design, and terminating at opposite ends;
   a holding means for holding said plurality of lamp units;
   a source of cleaning solution;
   a plurality of liquid retaining means for holding said cleaning solution, each of said encasing tubes being assigned at least one of said liquid retaining means, wherein each of said liquid retaining means is a ring made of semi-rigid porous material whose internal surface is in contact with the periphery of the respective encasing tube;
   a detachable holding and penetrating means for holding and puncturing said liquid retaining means, said penetrating means being in fluid communication with said source of cleaning solution to deliver said cleaning solution to said liquid retaining means; and,
   a drive means to displace each of said liquid retaining means along its respective encasing tube from one end of the encasing tube to the other end of the encasing tube.

2. The device of claim 1 wherein said porous material is natural or synthetic sponge.

3. The device of claim 1 wherein said porous material is a woven, braided or non-woven fibrous material.

4. The device of claim 1 wherein said porous material has a continuous non-permeable penetrable surface in those regions of its end faces and of its outer surface that are not in contact with the encasing tube.

5. The device of claim 1 further comprising scraper rings adjacent to said end faces.

6. The device of claim 1 wherein said cleaning liquid is designed to wet the surface of said encasing tubes under operating conditions and keep it wetted for at least a limited time.

7. The device of claim 1 wherein said holding means comprises a plurality of laterally open clamps attached to a frame, wherein each lamp unit is held by two clamps located at distal ends of the encasing tube.

8. The device of claim 1 wherein said holding and penetrating means comprises a plurality of clamps for holding said liquid retaining means, each of said clamps having a canula at its base for penetrating said continuous non-permeable penetrable surface of said liquid retaining means in any position and delivering said cleaning solution thereto, wherein said plurality of clamps is attached to said drive unit for moving said liquid retaining means to and fro in the longitudinal direction of said encasing tubes.

9. The device of claim 8 wherein said non-permeable penetrable surface of said liquid retaining means is resealed when said canula and said liquid retaining means are disconnected.

10. The device of claim 8 wherein each of said canulas is connected to a common supply line, said supply line supplying being supplied with cleaning solution by means of a stock container.

11. The device of claim 10 wherein said supply line is permanently attached to said drive unit.

12. The device of claim 10 wherein the cleaning liquid is fed into said supply line from said stock container by means of flexible hose lines.

13. The device of claim 10 wherein the cleaning liquid is fed in from the stock container by means of overpressure in the stock container.

* * * * *